United States Patent [19]

Little et al.

[11] 3,734,133
[45] May 22, 1973

[54] DIVERTER PINCH VALVE

[75] Inventors: Robert K. Little, Mount Holly; Edgar Barry Lincoln, Pennsauken, both of N.J.

[73] Assignee: RKL Controls, Inc., Hainesport, N.J.

[22] Filed: Dec. 2, 1970

[21] Appl. No.: 94,413

[52] U.S. Cl. ............137/636, 137/609, 251/6, 251/134
[51] Int. Cl. .............F16k 7/06, F16k 11/14
[58] Field of Search...........251/42, 10, 212; 137/609, 607, 601, 636; 222/503, 529

[56] References Cited

UNITED STATES PATENTS

| | | | |
|---|---|---|---|
| 2,624,364 | 1/1953 | Detlefsen | 251/7 X |
| 2,841,357 | 7/1958 | Little | 251/6 |
| 3,054,425 | 9/1962 | Pribonic | 251/9 X |
| 3,197,173 | 7/1965 | Taubenheim | 251/6 |
| 3,268,201 | 8/1966 | Little | 251/8 |

FOREIGN PATENTS OR APPLICATIONS 973,168   9/1950   France ........................251/7

*Primary Examiner*—Henry T. Klinksiek
*Assistant Examiner*—Richard Gerard
*Attorney*—Howson & Howson

[57] ABSTRACT

A pinch type diverter valve including a hollow Y-shaped resilient valve body having a pair of angularly disposed leg portions. The valve body is disposed within a housing which includes means for selectively pinching the leg portions to control flow therethrough. The pinching means includes an outer pinch bar and an inner pinch bar arranged in substantially opposed relation adjacent each leg portion, and actuating means for selectively moving the inner and outer pinch bars to provide a gas tight closure of one leg portion while at the same time providing a fully open passage within the other leg portion. The pinch bars may also be disposed selectively at any desired intermediate position, permitting use of the valve as a mixing valve.

14 Claims, 7 Drawing Figures

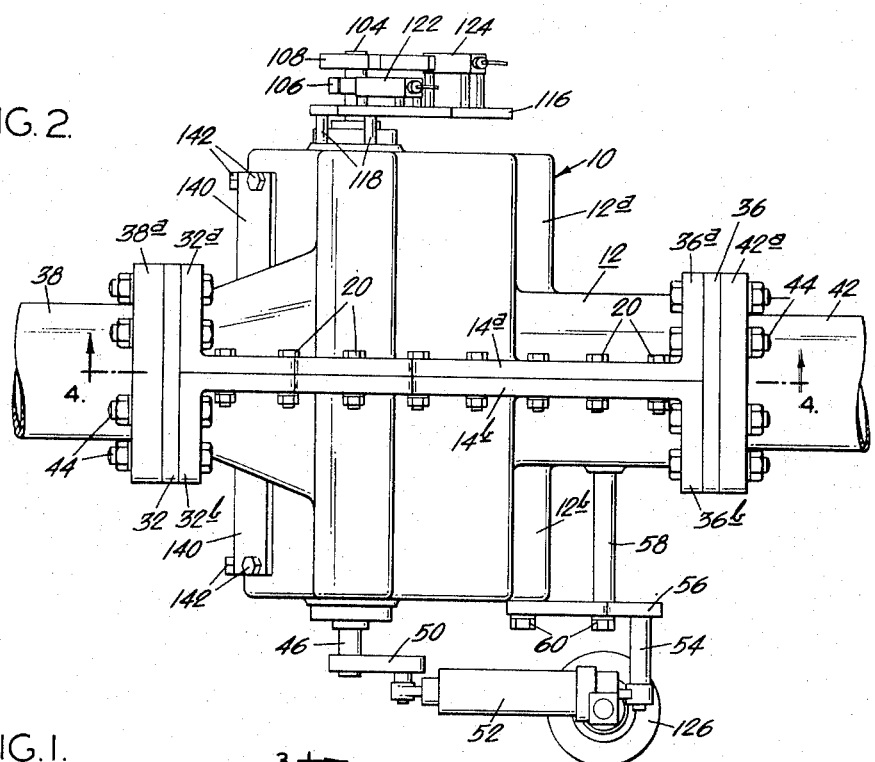
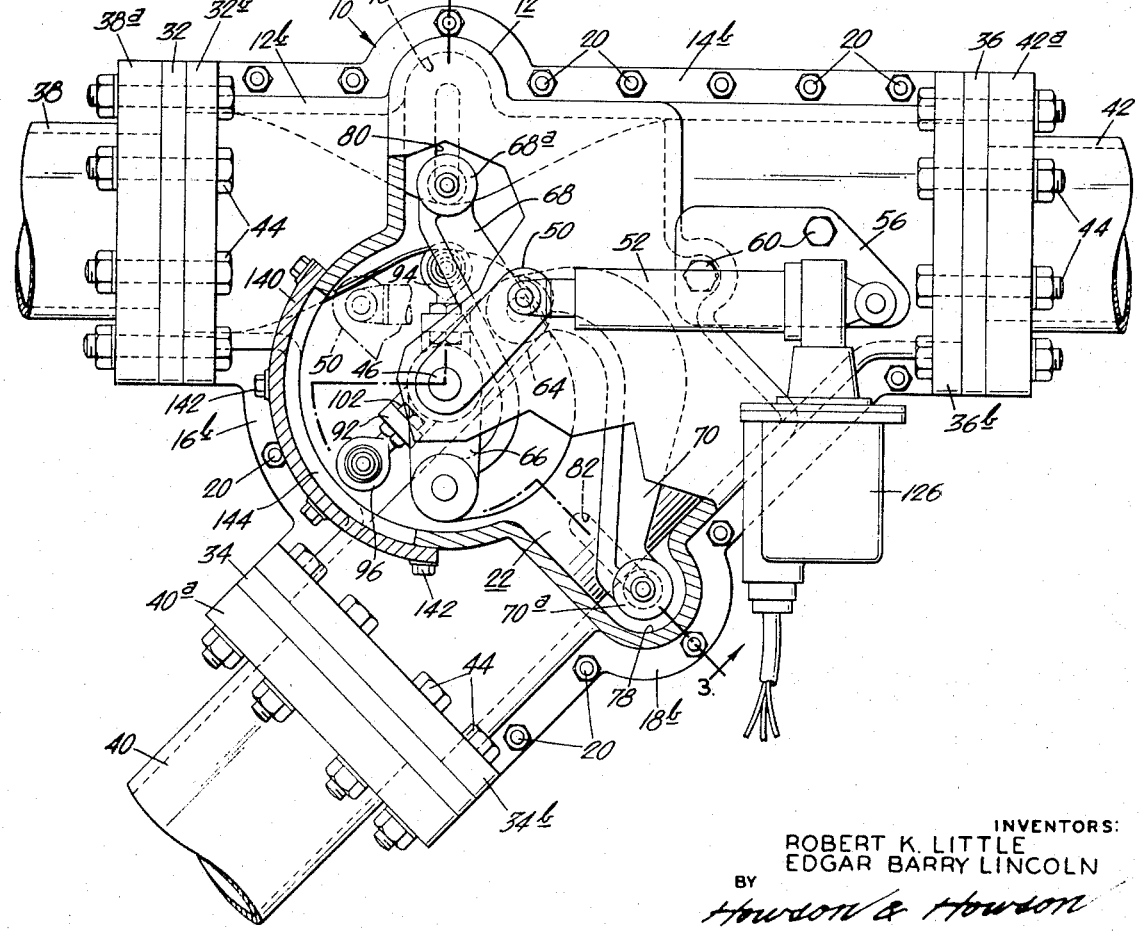

INVENTORS:
ROBERT K. LITTLE
EDGAR BARRY LINCOLN
BY
Howson & Howson
ATTYS.

INVENTORS:
ROBERT K. LITTLE
EDGAR BARRY LINCOLN
BY
Howson & Howson
ATTYS.

DIVERTER PINCH VALVE

The present invention relates generally to valves for controlling the flow of fluids and particulate solid materials and relates more particularly to a pinch type diverter valve which may also be employed as a mixing valve.

Pinch type valves have been widely employed to control the flow of such diverse products as dry abrasive granular materials and corrosive fluids. The popularity of this type of valve stems from its simplicity, smooth-walled flow path, ability to govern flows of fluid, solid, or mixed solid and fluid materials, and adaptability for remote operation. Pinch valves may be built in practically any required size, and require little or no maintenance.

An effective pinch type diverter valve has not been available prior to the present invention. It has formerly been necessary to couple a Y fitting with two pinch type valves to realize the advantages of the pinch type construction. Such an arrangement, however, adds substantially to the space requirements for installation and increases the dead volume of the valve leg not in use. Furthermore, the cost of two separate valves and the Y fitting and the cost of installation is substantially higher than that for a single diverter valve in accordance with the present invention.

A possible reason for the absence in the prior art of a successful pinch type diverter valve is the requirement of a pinching mechanism which will not unduly stress the valve body during opening and closing of the valve. In a conventional pinch valve, the valve body is secured at each end by means of flange portions which support the body wall portions and serve to control the body deformation during valve closure. In a diverter valve, however, the leg portions of the valve body at their juncture cannot effectively be supported so as to provide the control of the body walls which is provided by the conventional flanged end pinch valve. This lack of support at the leg portion intersection, which is known as the "nose" of the valve body, requires an actuating mechanism construction which will not unduly deform and stress the nose region during opening and closing of the valve.

In the present invention, a hollow resilient Y-shaped valve body is mounted in a housing and is provided with flanges which are secured between corresponding flanges of the housing and adjoining conduits. Inner and outer pinch bars are disposed in substantially opposed relation in the housing adjacent each of the angularly disposed leg portions of the valve body. Means are provided for moving the outer pinch bars linearly transversely to each said leg portion. The inner pinch bars, which are provided with rollers, are mounted in obtusely angled relation on an actuating shaft which is rotated to move one of the inner pinch bars toward closing engagement with a valve body leg portion while the other inner pinch bar is moved away from closing engagement with the opposed leg portion. The outer pinch bars which travel in guides at each end thereof in the housing, are connected by a crank linkage to the actuating shaft. The rotation of the actuating shaft accordingly serves to simultaneously control movement of the inner and outer pinch bars of both the valve body leg portions.

It is accordingly a first object of the present invention to provide a pinch type diverter valve having a novel actuating means which is controlled by rotation of a single drive shaft.

A further object of the invention is to provide a pinch type diverter valve as described having a separate set of pinch bars for each leg of the valve body, said sets of pinch bars being arranged for movement to simultaneously close one leg of the valve body while opening the opposite leg.

An additional object of the invention is to provide a pinch type diverter valve as described having a pair of angularly disposed leg portions, the proportionate flow through which may be varied as desired to permit use of the valve as a mixing valve.

A still further object of the invention is to provide a pinch type diverter valve as described which is adaptable to operation by a variety of means including hand labor, pneumatic actuator, hydraulic cylinder or by an electric motor driven actuator.

Still another object of the invention is to provide a pinch type diverter valve as described of a simple construction which requires a relatively small space for installation and which requires little or no maintenance.

Additional objects and advantages of the invention will be more readily apparent from the following detailed description of an embodiment thereof when taken together with the accompanying drawings in which:

FIG. 1 is a side elevational view of a pinch type diverter valve in accordance with the present invention with a portion thereof cut away to show interior details of the actuating mechanism;

FIG. 2 is a plan view on a slightly reduced scale of the valve shown in FIG. 1;

Figure 3:
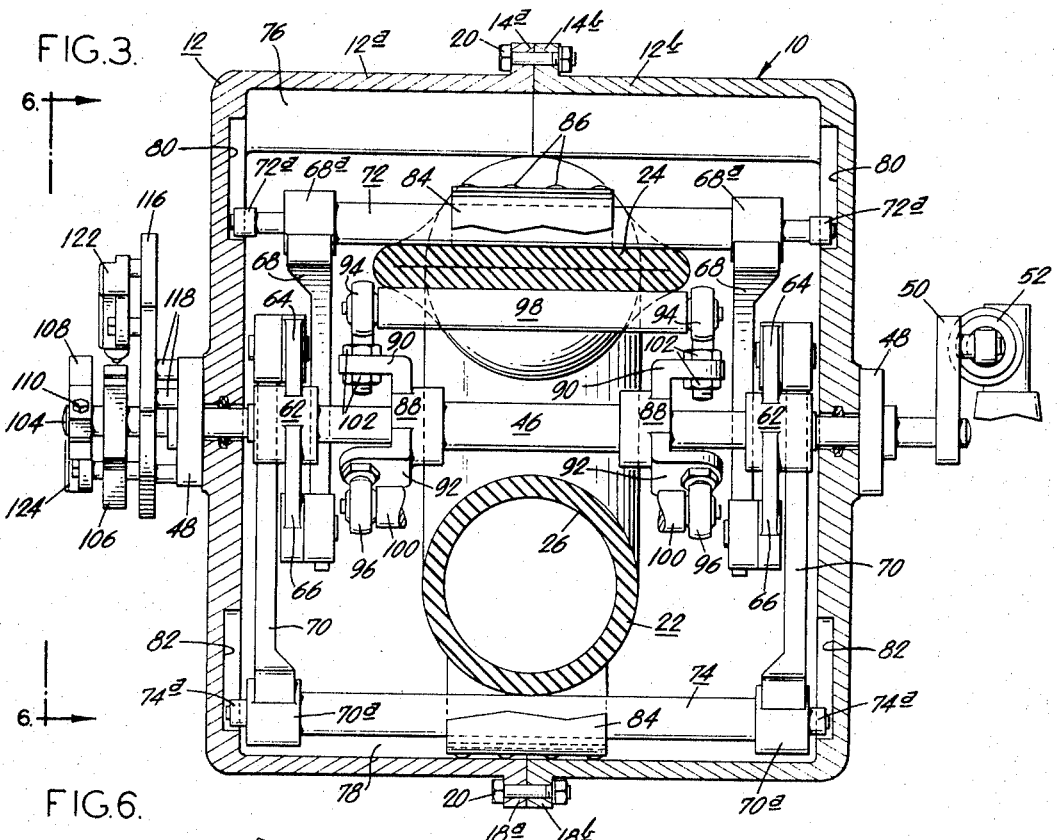
FIG. 3 is a sectional view taken along line 3—3 of FIG. 1.

Referring to the drawings, the pinch type diverter valve generally designated 10 constructed in accordance with the present invention comprises a housing 12 formed of opposed housing sections 12a and 12b. As shown most clearly in FIG. 4, the housing sections at their juncture along a vertical plane passing longitudinally through the valve have a generally Y-shaped configuration. The corresponding upper, side and diagonal lower edges of each housing section designated 14a,b; 16a,b and 18a,b respectively, are flanged to permit assembly of the sections by means of bolts 20.

Disposed within the housing 12 is a hollow resilient valve body 22 which is preferably a single piece molded fabric reinforced structure. For simplicity of illustration, the fabric reinforcement of the valve body, which is well known in this art, has not been shown. The valve body may be formed of a number of resilient materials such as pure gum rubber, urethane, neoprene, buna N, butyl, etc., depending upon the particular characteristics desired such as corrosive resistance, reactivity with materials conveyed and the like.

The valve body 22 is substantially Y-shaped, having a pair of angularly disposed leg portions 24 and 26, the passages of which intersect and communicate with a throat portion 28. At the juncture of the passages of the leg portions is located the portion 30 of the valve body which is known as the nose of the body. The ends of the leg portions 24 and 26 and the throat portion 28 are provided with flanges 32, 34 and 36 respectively, which overlie corresponding flanges 32a, 34a, and 36a of the housing. The leg portions 24 and 26 and the throat portion 28 are respectively connected to conduits 38, 40 and 42. These conduits include flanges 38a, 40a and 42a which are joined to the valve flanges by bolts 44 passing through suitable aligned holes. The bolted connection of the conduits serves to secure the flanged ends of the valve body leg portions and throat portion to the housing.

Means are provided for selectively pinching the valve body leg portions to control flow through the leg passages. This means includes a drive shaft 46 which, as shown most readily in FIG. 3, extends through both sides of the housing and is journaled in bearings 48 on the exterior of each of the housing sections 12a and 12b. On one end of the drive shaft 46 is mounted a crank 50 to which is connected the electric motor driven actuator 52 which is pivotally mounted on the support post 54 extending from support plate 56. The support plate 56 is secured to the housing and a brace 58 extending from the housing by bolts 60. By selective control of the actuator 52, the drive shaft 46 may be rotated and stopped at any desired position.

Secured to the drive shaft 46 within the housing and adjacent the inner walls of the housing at each side thereof are the outer pinch bar hubs 62. The shaft 46 is preferably shouldered to facilitate the accurate positioning of the hubs 62, which may be secured for rotation with the shaft by set screws or other suitable means. A pair of crank elements 64 and 66 extend in angularly disposed relation from each outer pinch bar hub 62 and are respectively pivotally connected to the outer pinch bar links 68 and 70. The enlarged ends 68a and 70a of the links 68 and 70 are bored to receive the outer pinch bars 72 and 74 respectively. The outer pinch bars 72 and 74 pass on the outer sides respectively of the valve body legs 24 and 26 and exert an inward pinching effect on those leg portions dependent upon the direction of rotation of the drive shaft 46.

Figure 4:
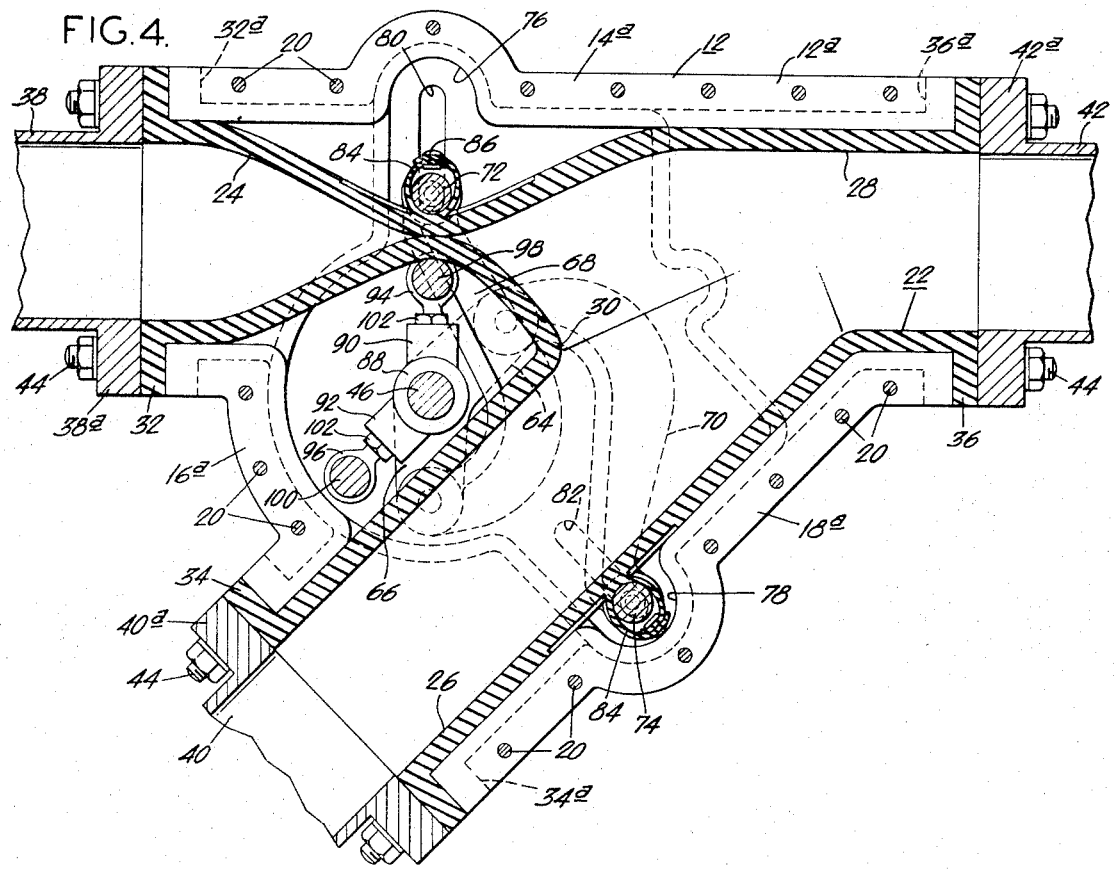
FIG. 4 is an enlarged sectional view taken along line 4—4 of FIG. 2 showing the upper leg portion in the closed position.

The housing walls as shown in FIG. 4 are recessed at 76 and 78 to receive the pinch bars 72 and 74 when they are disposed in their respective outermost positions. Guide means in the housing in the form of slots 80 and 82 slidably receive the extending ends of the pinch bars 72 and 74 which are provided with cylindrical slide elements 72a and 74a of a synthetic friction reducing material.

To insure the positive opening of the valve body leg portions when the outer pinch bars are moved outwardly, means are provided to connect the valve body leg portions with the outer pinch bars. In the embodiment illustrated, these means comprise tab elements 84 extending from the valve body exterior wall which are looped around the outer pinch bars and secured by rivets 86. The tab elements 84 are preferably formed in the reinforced manner disclosed in U.S. Pat. No. 3,268,201, assigned with the present invention to a common assignee.

Mounted inwardly of the outer pinch bar hubs on the drive shaft 46 are the inner pinch bar hubs 88 which abut an inner shouldered portion of the drive shaft and are secured to the shaft by means such as set screws. The inner hubs 88 each include a pair of obtusely angularly disposed arms 90 and 92 on which are mounted the radially outwardly extending spherical bearings 94 and 96 respectively. Inner pinch bars 98 and 100 respectively extend between the spherical bearings 94 and 96 which provide free rotation of the pinch bars. The spherical bearings 94 and 96 are adjustably mounted on the arms 90 and 92 by threaded shank portions which pass through suitable bores in the arms and are adjustable with respect thereto by means of nuts 102. The inner pinch bars may thus be accurately and independently adjusted during assembly of the valve to insure the proper spacing relationship and parallel alignment of the inner and outer pinch bars at the closed position of each leg portion.

Figure 6:
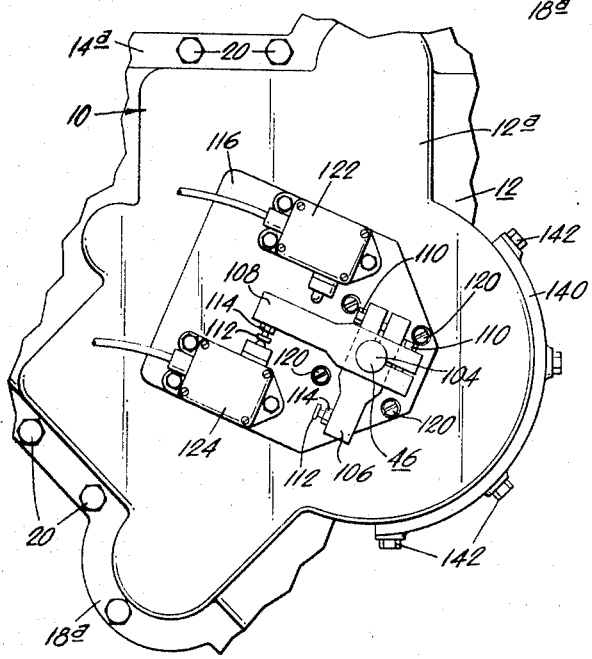
FIG. 6 is a fragmentary elevational view taken along line 6—6 of FIG. 3.

Although it will be apparent from the following description of the operation of the valve that the drive shaft 46 may be rotated manually or in a manner other than that presently described, in the present instance means are provided for electrically actuating the valve and controlling and indicating the position of the pinch bars. This means includes an extending portion 104 of the drive shaft at the opposite end from the crank 50 on which are mounted the axially spaced limit switch actuating arms 106 and 108 as most readily seen in FIGS. 3 and 6. These arms are bored to receive the drive shaft and are secured to the shaft by the screws 110 which tighten the bifurcated arm end portions. Switch actuating elements 112 on the opposite ends of the arms are threadedly mounted in the arm ends and include lock nuts 114 to secure the fine adjustment of the elements.

A switch holding plate 116 is mounted adjacent the housing on the four support arms 118 by screws 120. Limit switches 122 and 124 are attached to the plate 116 and are elevated above the plate so as to lie in the plane of rotation of and hence be respectively engaged by the arms 106 and 108.

Figure 7:
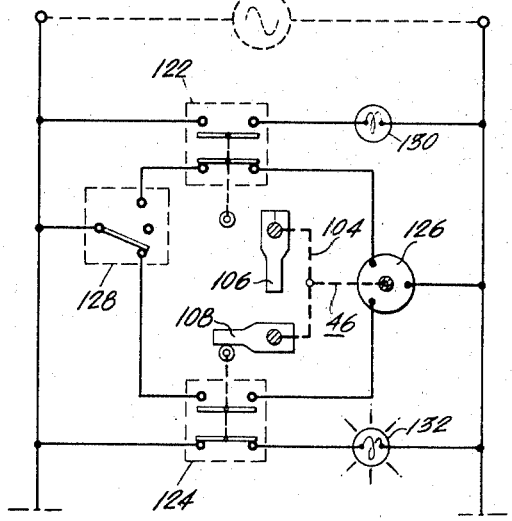
FIG. 7 is a schematic diagram showing an electrical wiring arrangement for controlling the valve.

In FIG. 7 a schematic wiring diagram is shown for connecting the limit switches with the actuator motor and a control switch. The actuator motor 126 is a reversible motor and its direction of rotation is dependent upon whether the voltage is supplied through the limit switch 122 or limit switch 124. A three position switch 128 permits the control of direction of rotation of the drive shaft by selection of the limit switch through which the voltage is supplied and permits the mechanism to be stopped at any desired position. Signal lights 130 and 132 are coupled respectively with the limit switches 122 and 124 to indicate the completely closed condition of one of the valve body legs and the completely open condition of the other leg.

In operation, the valve is coupled with the adjacent conduits 38, 40 and 42 as illustrated and the actuator and control circuit is connected with a source of electric power. The switch 128 may then be used to selectively actuate the motor 126 to provide the desired rotation of the drive shaft 46. The rotation of the drive shaft simultaneously opens one of the body portion leg portions while closing the other leg portion since the inner and outer pinch bar hubs are both mounted on and secured to the drive shaft. The rotation of the shaft results in a linear inward or outward movement of the outer pinch bars in the housing slots while the inner pinch bars roll into and out of engagement with the inner walls of the leg portions. In the completely closed position of one of the leg portions, as clearly seen in FIG. 4, the inner pinch bar is aligned with the outer pinch bar and the drive shaft so there is no turning moment on the drive shaft as a result of the valve body deformation.

When the valve is used as a mixing valve, upstream pressure will tend to balloon the valve body leg portion to hold the inner pinch bar in the fully closed position. When the valve is used as a diverter valve, the line pressure may tend to open the closed leg and for this reason suitable positive locking actuators should be employed.

An important aspect of the present valve is the independently adjustable inner pinch bars. By adjustment of the nuts 102, the inner pinch bars may be accurately aligned and spaced with respect to the outer pinch bars in the closed position of each leg and hence a gas tight seal of each leg portion may be achieved.

Since during closure of each leg portion, the inner pinch bar rolls against the valve body in a direction away from the flanged end of the leg portion and toward the nose 30 of the valve body, there is a minimal amount of stress and deformation on the nose which being unsupported is vulnerable to failure from repeated deformations. The tabs 84 provide a positive opening of the leg portions and are particularly important for valves which are subject to infrequent operation.

Figure 5:
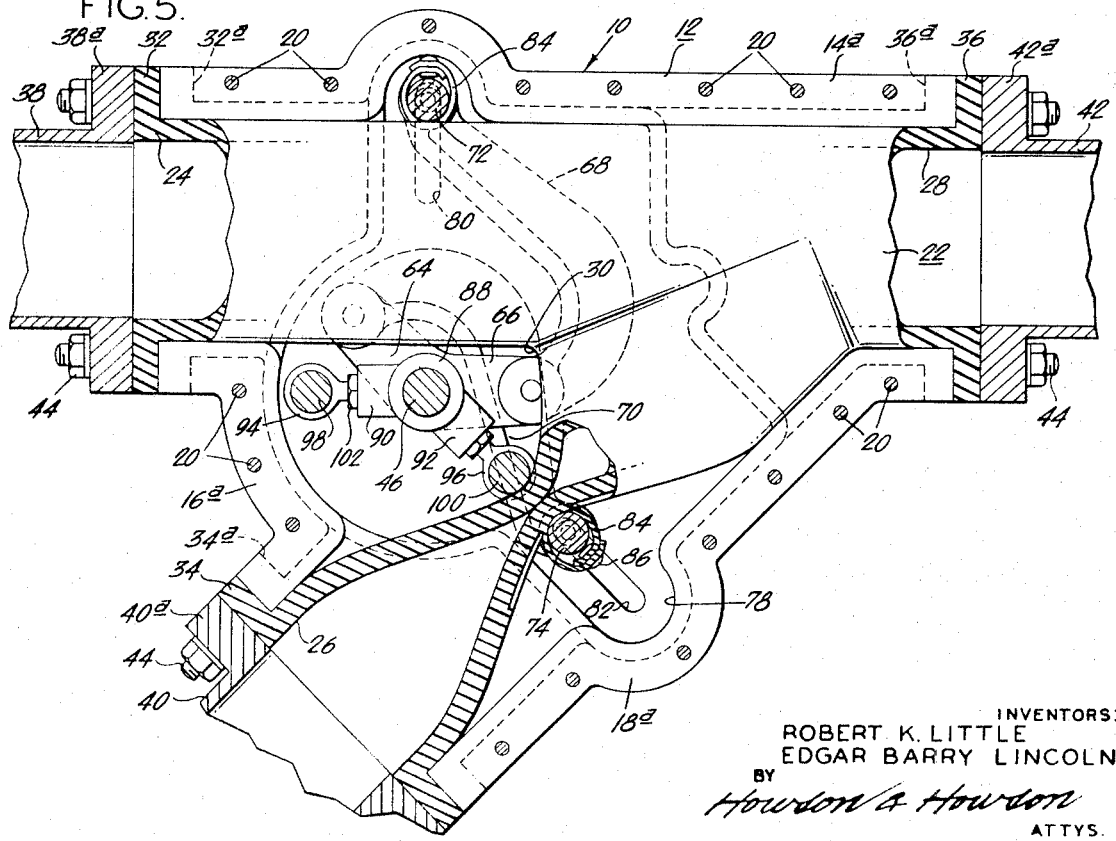
FIG. 5 is a sectional view similar to FIG. 4 but showing the lower leg in the closed position.

For use as a diverter valve, the flow of material would enter the throat portion 28 of the valve and be selectively discharged through either leg portion 24 or 26 or divided between the two leg portions. For use as a mixing valve, two different materials would be introduced through the leg portions 24 and 26 and would be intermixed as they passed through the throat portion 28 of the valve. For both the mixing and diverting functions, the amount of flow through each leg may be adjusted as desired by a chosen intermediate setting of the drive shaft between the two extreme positions illustrated in FIGS. 4 and 5. The drive shaft is rotated through 90° between the two extreme positions and it will be apparent that a rotation of 45° would provide a 50 percent closure of each of the leg portions. Rotation of the drive shaft may of course be stopped at any point to provide an opening of either leg of from 0 to 100 percent of its flow capacity.

The limit switches stop the actuator when the pinch bars have closed one of the valve body leg portions. In the illustrated embodiment, the leg 24 is closed, and the limit switch 124 has been engaged by the arm 108 to open the motor circuit and close the circuit to signal light 132. Since the motor circuit limit switches are normally closed switches, the valve can be further actuated only by turning the switch 128 to direct current through the limit switch 122.

To permit ready access to the interior of the valve, cover plates 140 are demountably secured by bolts 142 over apertures 144 in each housing section. Adjustment of the pinch bars and inspection of the operating mechanism may accordingly be made through the apertures 144 and preclude the need for unbolting the housing section flanges.

The construction of the valve body may as indicated above be varied depending on the materials to be conveyed and the conveying pressures. In the normal construction, a fabric reinforcing will extend throughout the valve body although for extremely low pressure operation, the fabric can be restricted to the flanged portions of the body. Although the flanged construction is preferred, it would be possible to construct the valve body with enlarged or slip-on ends. The flanged construction provides the strongest valve body design and may be reinforced if desired with metal rings molded into each of the flanged ends.

It will be observed that the present valve leg portions in the open condition open to the full diameter of the valve passages without any constrictions. This smooth walled full opening feature makes the valve particularly suitable for handling materials which are difficult to convey through conventional valves. The valve is especially suited for handling such materials as plastic pellets, dry or wet cement slurry, cereals, drugs, chemical powders, abrasives, mining slurries, and corrosive solutions. The valve is economical to manufacture and maintain. In the unlikely event of valve body failure, a replacement can be quickly and economically installed.

As indicated, the drive shaft may be rotated by means other than the electric motor driven actuator shown. For example, a self-locking hand lever or wheel or a pneumatic or hydraulic actuator could be employed. It is anticipated that the larger and remotely located valves will be equipped with some type of automatic actuating device such as that shown in the described embodiment.

Similarly, other changes in details of construction can be effected by those skilled in the art without departing from the spirit and the scope of the invention.

We claim

1. A pinch type diverter valve comprising a housing, a hollow Y-shaped resilient valve body disposed in said housing and having a pair of angularly disposed leg portions and a common conduit portion communicating therewith, means on said housing for selectively pinching said valve body leg portions to control flow through the passages therein comprising pairs of pinch bars disposed in substantially opposed relation adjacent opposite sides of each leg portion, and common actuating means connected to each of said pairs of pinch bars operable selectively to move one of said pairs of pinch bars toward and away from one of said leg portions and simultaneously move the other of said pairs of pinch bars away from and toward the other of said leg portions, whereby the said leg portions are alternately opened and closed.

2. A pinch type diverter valve as claimed in claim 1 wherein said actuating means comprises a drive shaft rotatably mounted in said housing, means for rotating said drive shaft, and means connecting said inner and outer pinch bars to said drive shaft, said latter means being adapted upon rotation of said drive shaft to move said pinch bars to close one of said leg portions while opening the other leg portion.

3. A pinch type diverter valve as claimed in claim 2, said means for pinching said valve body leg portions being adapted to provide a complete closure of one said leg portion while simultaneously providing a complete opening of the other said leg portion.

4. A pinch type diverter valve comprising a housing, a hollow Y-shaped resilient valve body disposed in said housing and having a pair of angularly disposed leg portions and a common conduit portion communicating therewith, means on said housing for selectively pinching said valve body leg portions to control flow through the passages therein, said means comprising a drive shaft rotatably mounted in said housing, means for selectively rotating said drive shaft, said drive shaft passing between said valve body leg portions and being disposed transversely thereto, inner and outer pinch bars disposed in substantially opposed relation in said housing adjacent each said leg portion, said inner pinch bars being mounted in parallel spaced relation to said drive shaft for rotation therewith, and means operatively connecting said outer pinch bars with said drive shaft, the movement of said pinch bars upon rotation of said drive shaft effecting the closure of one of said leg portions while opening the other of said leg portions.

5. A pinch type diverter valve as claimed in claim 4 including bearing means supporting said inner pinch bars whereby said pinch bars may freely rotate during movement thereof against said valve body.

6. A pinch type diverter valve as claimed in claim 4 wherein said means operatively connecting said outer pinch bars with said drive shaft comprises crank means on said drive shaft, and link means connecting said crank means with said outer pinch bars, said crank and link means being so arranged as to effect upon rotation of said drive shaft a movement of one of said outer pinch bars toward said crankshaft while simultaneously moving the other said pinch bar away from said drive shaft.

7. A pinch type diverter valve as claimed in claim 6 including guide means in said housing engaging the ends of said outer pinch bars to effect a linear movement of said pinch bars transversely to the adjacent leg portions upon rotation of said drive shaft.

8. A pinch type diverter valve as claimed in claim 6 including tab means extending from said valve body leg portions and connected with said outer pinch bars for providing a positive opening of said leg portions.

9. A pinch type diverter valve comprising a housing, a hollow Y-shaped resilient valve body disposed in said housing and having a pair of angularly disposed leg portions and a common conduit portion communicating therewith, means on said housing for selectively pinching said valve body leg portions to control flow through the passages therein, said means comprising a drive shaft rotatably mounted in said housing disposed between and transversely to said valve body leg portions, means for selectively rotating said drive shaft, inner and outer pinch bars disposed in substantially opposed parallel relation in said housing adjacent each said leg portion, inner pinch bar hubs mounted in spaced relation on said drive shaft for rotation therewith, a pair of angularly disposed arms extending from each said inner pinch bar hub, bearings extending from each of said arms for rotatably supporting said inner pinch bars therebetween in substantially parallel spaced relation to said drive shaft, means for adjusting the radial position of each said bearing to permit the adjustment of said inner pinch bars, a pair of outer pinch bar hubs mounted in spaced relation on said drive shaft, a pair of angularly disposed crank elements extending from each said outer pinch bar hub, links pivotally connecting said crank elements with said outer pinch bars, and guide means in said housing cooperating with said outer pinch bars for guiding said outer pinch bars in a linear transverse path with respect to said leg portions upon rotation of said drive shaft, the rotation of said drive shaft moving said pinch bars to close one of said leg portions while opening the other of said leg portions.

10. A pinch type diverter valve as claimed in claim 9, said means for pinching said valve body leg portions being adapted to provide a complete closure of one said leg portion while simultaneously providing a complete opening of the other said leg portion.

11. A pinch type diverter valve as claimed in claim 9 wherein the ends of said Y-shaped valve body are flanged and wherein said housing is correspondingly flanged to cooperate with and support the flanged ends of said valve body.

12. A pinch type diverter valve as claimed in claim 9 including tab elements extending from said valve body and connected with said outer pinch bars to insure a positive opening of said valve body leg portion passages.

13. A pinch type diverter valve as claimed in claim 9 wherein said means for rotating said drive shaft comprises an electric motor drive actuator.

14. A pinch type diverter valve as claimed in claim 13 including means for automatically stopping said actuator when either of said leg portions is pinched into the fully closed position.

14. A pinch type diverter valve as claimed n claim 13 including means for automatically sopping said actuator when either of said leg portions is pinched into the fully closed position

* * * * *